United States Patent
Thistle et al.

(10) Patent No.: US 10,724,386 B2
(45) Date of Patent: Jul. 28, 2020

(54) BLADE PLATFORM WITH DAMPER RESTRAINT

(71) Applicant: United Technologies Corporation, Farmington, CT (US)

(72) Inventors: Charles Thistle, Middletown, CT (US); Mohamed Hassan, Palm City, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 63 days.

(21) Appl. No.: 15/680,807

(22) Filed: Aug. 18, 2017

(65) Prior Publication Data
US 2019/0055848 A1    Feb. 21, 2019

(51) Int. Cl.
| F01D 5/30 | (2006.01) |
| F01D 5/10 | (2006.01) |
| F01D 11/00 | (2006.01) |
| F04D 29/38 | (2006.01) |
| F04D 29/66 | (2006.01) |
| F01D 25/06 | (2006.01) |

(52) U.S. Cl.
CPC .............. *F01D 5/3076* (2013.01); *F01D 5/10* (2013.01); *F01D 11/003* (2013.01); *F01D 11/008* (2013.01); *F01D 25/06* (2013.01); *F04D 29/388* (2013.01); *F04D 29/668* (2013.01); *F05D 2240/55* (2013.01); *F05D 2240/80* (2013.01); *F05D 2260/96* (2013.01)

(58) Field of Classification Search
CPC ...... F01D 11/003; F01D 11/008; F01D 25/06; F01D 5/10; F01D 5/3076; F04D 29/388; F04D 29/668; F05D 2240/55; F05D 2240/80; F05D 2260/96
See application file for complete search history.

(56) References Cited

U.S. PATENT DOCUMENTS

| 5,313,786 A | 5/1994 | Chlus et al. |
| 2012/0049461 A1* | 3/2012 | Deo ........................ F01D 11/02 277/303 |
| 2012/0198858 A1* | 8/2012 | Rabe ........................ F01D 5/10 60/805 |

(Continued)

FOREIGN PATENT DOCUMENTS

EP    2009247 A1    12/2008

OTHER PUBLICATIONS

European Search Report for Application No. EP 18 18 9796.

*Primary Examiner* — Lindsay M Low
*Assistant Examiner* — Ruben Picon-Feliciano
(74) *Attorney, Agent, or Firm* — Cantor Colburn LLP

(57) ABSTRACT

A gas turbine engine, having: a disk; a plurality of blades secured to the disk, each of the plurality of blades having a platform located between a root portion and an airfoil portion of the blade, wherein the platform of one of the plurality of blades is configured to define a cavity with a platform of an adjacent blade that is secured to the disk; a damper seal located in the cavity and positioned adjacent to a gap defined by edges of the platforms of the blades; and a damper restraint located on an interior surface of each platform, wherein the damper restraint extends into the cavity and is a raised feature configured to contact a peripheral edge portion of a damper seal when it is adjacent to the gap defined by the platforms of the blades.

16 Claims, 4 Drawing Sheets

(56) References Cited

U.S. PATENT DOCUMENTS

| | | | |
|---|---|---|---|
| 2013/0058785 A1* | 3/2013 | Kellerer | F01D 5/16 |
| | | | 416/1 |
| 2013/0195665 A1* | 8/2013 | Snyder | F01D 5/22 |
| | | | 416/174 |
| 2014/0003950 A1 | 1/2014 | Beattie et al. | |
| 2016/0153303 A1* | 6/2016 | Hough | F01D 11/006 |
| | | | 416/193 A |
| 2016/0194972 A1 | 7/2016 | Snyder | |
| 2016/0273367 A1 | 9/2016 | Lana et al. | |

\* cited by examiner

BLADE PLATFORM WITH DAMPER RESTRAINT

BACKGROUND

Exemplary embodiments of the present disclosure are directed to turbine blades and/or compressor blades for a gas turbine engine and methods for restraining a damper of a turbine blade and/or compressor blade.

A gas turbine engine includes a plurality of turbine blades and compressor blades each received in a slot of a disk. The blades are exposed to aerodynamic forces that can result in vibratory stresses. A seal damper or damper can be located under platforms of adjacent blades to reduce the vibratory response and provide frictional damping between the blades. The seal damper slides on an underside of the platforms. The seal damper is made of a material that is dissimilar from the material of the blades. When the vibratory motions of adjacent blades oppose each other (that is, occur out of phase), the seal damper slides to absorb the energy of vibration.

Seal dampers work by conforming to the underside of blade platforms to seal the mate-face gap between blades and provide frictional damping to suppress the vibratory response of the blades to excitations in the engine. These dampers are typically made of sheet metal and have been shown to readily conform to the underside of the platform when subjected to centrifugal loads in a high temperature environment due to their lack of stiffness out-of-plane.

Sometimes seal dampers will experience unintentional bulk tangential movement relative to the damper pocket due to the dynamic forces imposed on it by the rotation of the blades and the lack of sufficient restraint devices. To maximize damper efficiency, damper configurations are sought which minimize weight and maximize damper stiffness. Thus it is desirable to limit the number of weight increasing restraint devices on the damper.

Accordingly, it is desirable to a method and apparatus for restraining movement of a damper with respect to a blade platform.

BRIEF DESCRIPTION

In one embodiment, a section of a gas turbine engine is provided. The section having: a disk; a plurality of blades secured to the disk, each of the plurality of blades having a platform located between a root portion and an airfoil portion of the blade, wherein the platform of one of the plurality of blades is configured to define a cavity with a platform of an adjacent blade that is secured to the disk; a damper seal located in the cavity and positioned adjacent to a gap defined by edges of the platforms of the blades; and a damper restraint located on an interior surface of each platform, wherein the damper restraint extends into the cavity and is a raised feature configured to contact a peripheral edge portion of a damper seal when it is adjacent to the gap defined by the platforms of the blades.

In addition to one or more of the features described above, or as an alternative to any of the foregoing embodiments, the damper restraint may be a circular protrusion that extends from the interior surface.

In addition to one or more of the features described above, or as an alternative to any of the foregoing embodiments, the blade may be a turbine blade.

In addition to one or more of the features described above, or as an alternative to any of the foregoing embodiments, the damper restraint may be a circular protrusion that extends from the interior surface.

In addition to one or more of the features described above, or as an alternative to any of the foregoing embodiments, the blade may be a compressor blade.

In addition to one or more of the features described above, or as an alternative to any of the foregoing embodiments, the damper seal may be formed from stamped sheet metal.

In addition to one or more of the features described above, or as an alternative to any of the foregoing embodiments, the damper seal may have a pair of tab portions extending from opposite sides of the damper seal.

In addition to one or more of the features described above, or as an alternative to any of the foregoing embodiments, the pair of tab portions may engage the damper restraints when the damper seal is adjacent to the gap defined by the platforms of the blades.

In addition to one or more of the features described above, or as an alternative to any of the foregoing embodiments, the blades may further comprise a damper shelf that is located in the cavity and the pair of tab portions are configured to engage the damper shelf.

In addition to one or more of the features described above, or as an alternative to any of the foregoing embodiments, the damper seal may further comprise a tongue portion configured to be located adjacent to the damper shelf.

In yet another embodiment, a gas turbine engine is provided. The gas turbine engine having: a compressor section; a turbine section; a disk, wherein the disk is a portion of the compressor section or a portion of the turbine section; a plurality of blades secured to the disk, each of the plurality of blades having a platform located between a root portion and an airfoil portion of the blade, wherein the platform of one of the plurality of blades is configured to define a cavity with a platform of an adjacent blade that is secured to the disk; a damper seal located in the cavity and positioned adjacent to a gap defined by edges of the platforms of the blades; and a damper restraint located on an interior surface of each platform, wherein the damper restraint extends into the cavity and is a raised feature configured to contact a peripheral edge portion of a damper seal when it is adjacent to the gap defined by the platforms of the blades.

In addition to one or more of the features described above, or as an alternative to any of the foregoing embodiments, the damper restraint may be a circular protrusion that extends from the interior surface.

In addition to one or more of the features described above, or as an alternative to any of the foregoing embodiments, the blade may be a turbine blade or a compressor blade.

In addition to one or more of the features described above, or as an alternative to any of the foregoing embodiments, the damper seal may be formed from stamped sheet metal.

In addition to one or more of the features described above, or as an alternative to any of the foregoing embodiments, the damper seal may have a pair of tab portions extending from opposite sides of the damper seal.

In addition to one or more of the features described above, or as an alternative to any of the foregoing embodiments, the pair of tab portions may engage the damper restraints when the damper seal is adjacent to the gap defined by the platforms of the blades.

In addition to one or more of the features described above, or as an alternative to any of the foregoing embodiments, the blades may further comprise a damper shelf that is located in the cavity and the pair of tab portions are configured to engage the damper shelf.

In addition to one or more of the features described above, or as an alternative to any of the foregoing embodiments, the damper seal may further comprises a tongue portion configured to be located adjacent to the damper shelf.

In yet another embodiment, a method of damping vibrations between adjoining blades of a gas turbine engine is provided. The method including the steps of: locating a damper seal adjacent to a seam defined by adjoining platforms of blades of the gas turbine engine; and restraining the movement of the damper seal in a direction away from the seam by retaining the damper seal with at least two protrusions extending from an interior surface of a cavity defined by the adjoining platforms, wherein the at least two protrusions contact a peripheral edge portion of the damper seal when it is adjacent to the seam defined by the adjoining platforms of the blades.

In addition to one or more of the features described above, or as an alternative to any of the foregoing embodiments, the damper seal may be formed from stamped sheet metal and the blade is either a compressor blade or a turbine blade

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
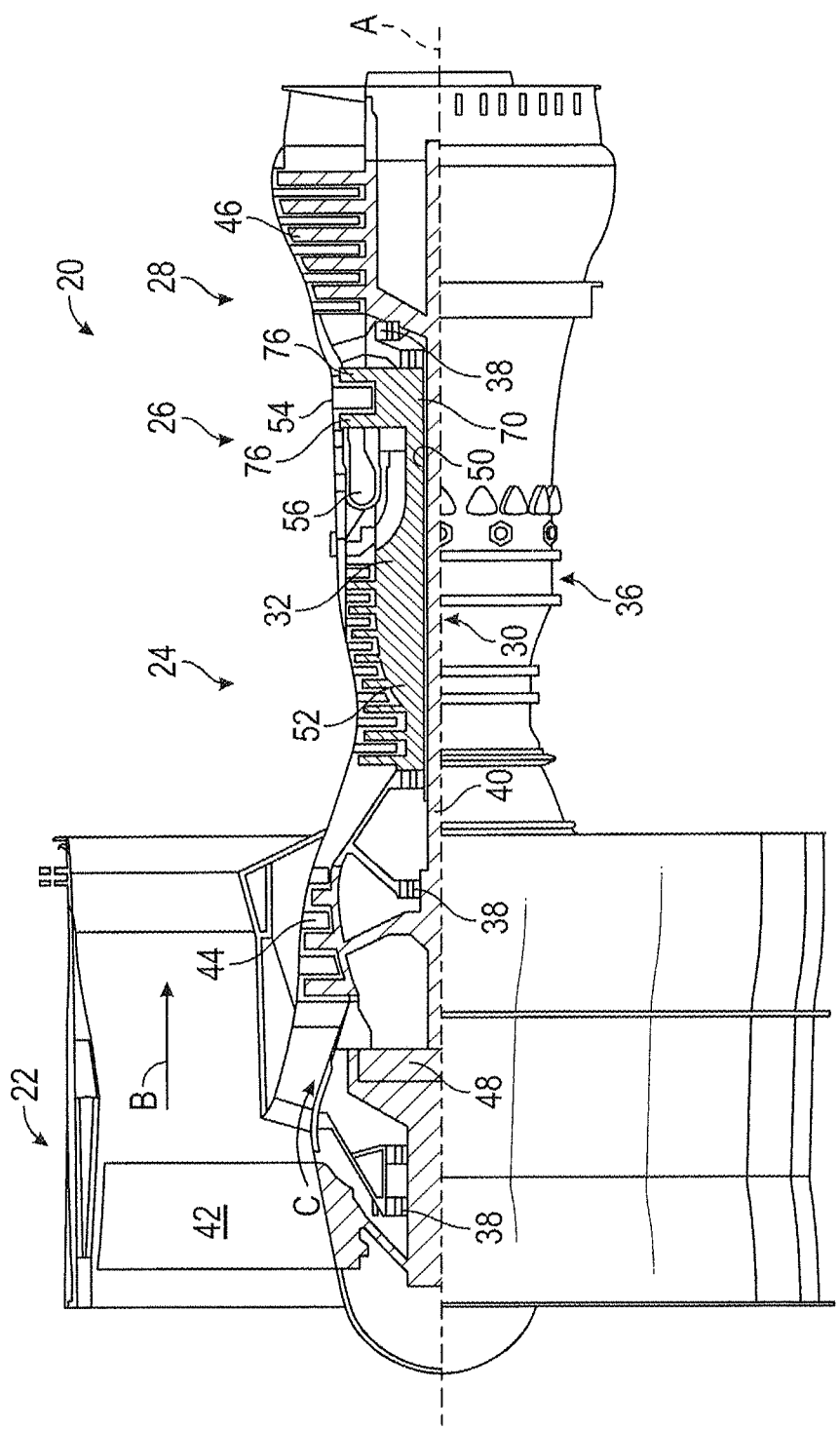
FIG. 1 is a partial cross sectional view of a gas turbine engine.
Figure 2:
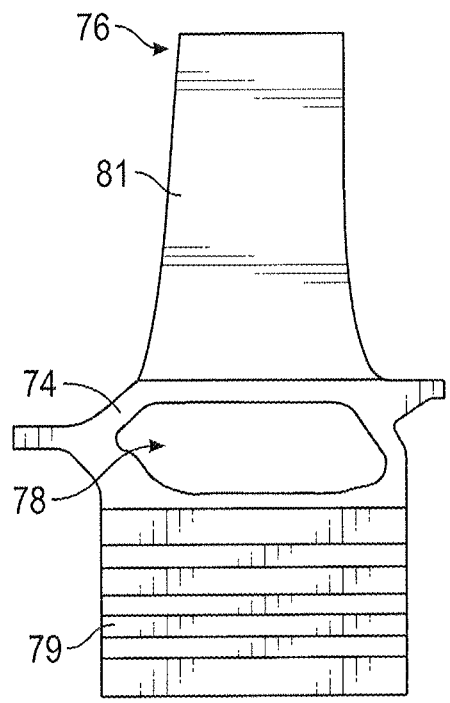
FIG. 2 is a side view of a turbine blade with an under platform damper restraint.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

The turbine section 28 includes turbine discs 70 that each rotate about the axis A. As is known in the related arts, the turbine section may include a plurality of stages each having a plurality of turbine blades mounted to respective turbine disk of each stage.

Referring now to FIGS. 1-5, a damper seal or damper 72 for installation under platforms 74 of adjacent turbine blades 76 to reduce the vibratory response and provide frictional damping between the turbine blades as well as sealing the mate-face gap between blades is illustrated. These dampers may be made of sheet metal and conform to the underside of the platform when subjected to centrifugal loads in a high temperature environment due to their lack of stiffness out-of-plane. Although the present disclosure is described with reference to turbine blades it is understood that anyone of the various embodiments disclosed herein may be applied to platforms of adjacent compressor blades of a compressor disc or rotor to reduce the vibratory response and provide frictional damping between the compressor blades as well as sealing the mate-face gap between blades. Therefore and when referring to FIGS. 2-5 these may alternatively be referred to as compressor blades. Moreover, various embodiments of the present disclosure may be applied in any other application where there is a desire to reduce the vibratory response and provide frictional damping between two adjoining items that are rotated about an axis as sealing the mate-face gap between the two adjoining items.

The damper seal or damper 72 may also be formed by direct metal laser sintering. Other manufacturing methods are possible. The damper seal 72 may be ductile enough to conform to a lower surface of the platform of the turbine blade.

Figure 3:
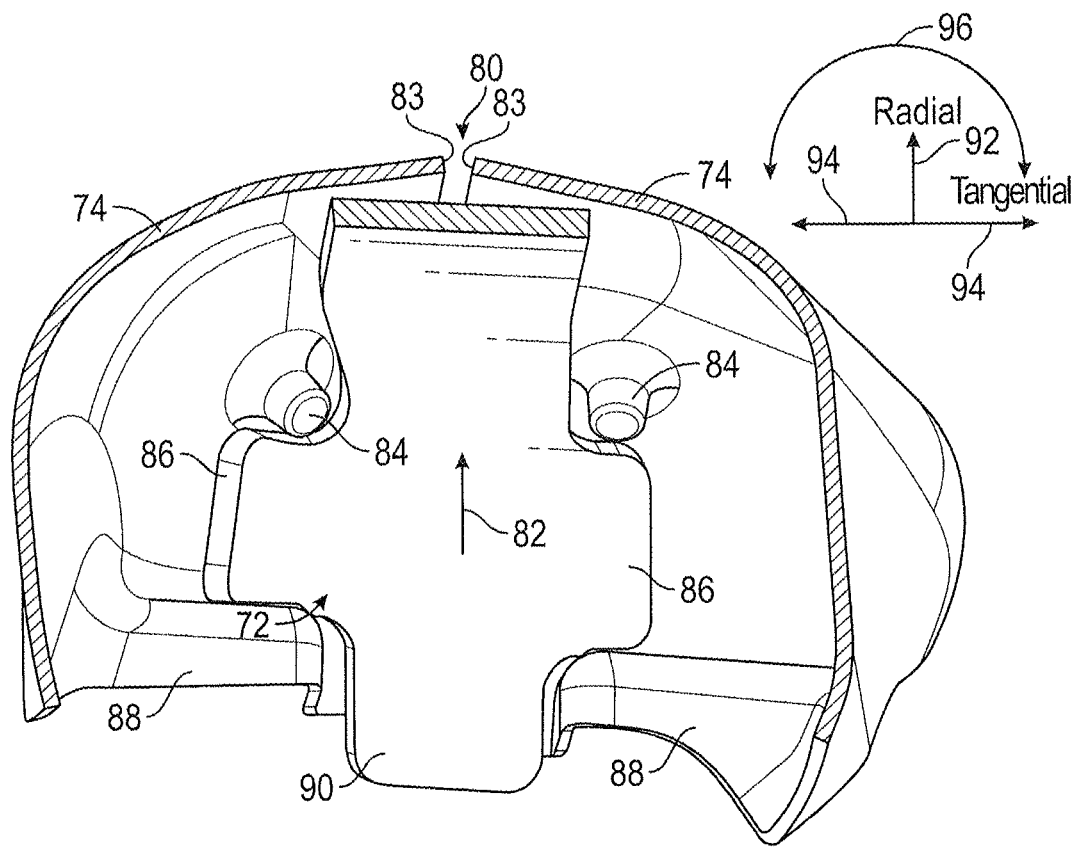
FIG. 3 is a partial perspective view of a damper seal installed between two adjacent turbine blades.

In FIG. 3, a partial bottom cross-sectional perspective view of the damper seal 72 installed in adjacent turbine blades 76 is provided. The damper seal 72 is located in a neck cavity 78 of the turbine blades 76. As illustrated in at least FIGS. 2 and 3, the neck cavity 78 is defined as being located below the platform 74 of the turbine blade 76 and above the turbine disk 70 the blades 76 are secured to. In other words, the neck cavity 78 is located above a root 79 of the turbine blade 76 but below the platform 74 of the turbine blade 76. Also shown is an airfoil portion 81 of the blade 76.

As illustrated, the damper seal 72 spans a space, seam or gap 80 between adjacent platforms 74 of adjacent turbine blades 76 when they are secured to the disk 70. The gap 80 being defined by adjacent edges 83 of platforms 74. The damper seal 72 provides both damping and sealing to prevent the leakage of the cooling air from the cavity 78. The damper seal 72 imposes a normal load on the adjacent turbine blades 76 due to a centrifugal force illustrated by arrow 82, when the rotor or disk 70 the blades 76 are secured to rotates. The resulting frictional force created by the normal load produces damping to reduce a vibratory response. The damper seal 72 also prevents cooling air in the neck cavity 78 from leaking into the hot flow gas path between airfoils of the turbine blades 76.

In accordance with an embodiment of the present disclosure, a damper restraint 84 for retaining a damper seal 72 received in the cavity 78 is provided. In one embodiment, the damper restraint 84 is a raised portion of material, rib, cylinder, circular protrusion, bump or feature located on an underside of the platform 74.

The damper restraint 84 is configured to engage at least a peripheral edge and/or tab portion 86 of the damper seal 72 that extends from a lateral or peripheral edge of the damper seal 72 and is located between a first end portion and an opposing second end portion of the damper seal 72. The damper restraint will provide undesired radial and tangential movement of the damper seal 72. As illustrated in FIG. 3, the damper seal 72 has a pair of tab portions 86, which engage a pair of damper restraints 84 of adjacent platforms 74 of a pair of turbine blades 76 when the damper seal 72 is installed between the pair of adjacent turbine blades 76. In addition and as illustrated in FIG. 3, the tab portions 86 each rest upon a shelf or damper shelf 88 in the damper pocket or cavity 78 when the damper seal 72 is not in operation (e.g., blades are not rotating). In other words, the shelves 88 prevent the damper seal 72 from falling out of the pocket 78 when the blades 76 are not rotating. In one embodiment, the damper shelf 88 is cast into the blade pocket 78.

In addition, the damper restraint 84 may comprise a "tongue" or "tongue portion" 90 located at a distal end of the damper seal 72. The tongue or tongue portion 90 of the damper seal 72 also prevents tangential motion (arrows) 92 of the damper seal 72. Although FIG. 2 only illustrates one end of the damper seal 72 it is, of course, understood that the damper seal 72 may have another opposite end similar to the one shown in FIG. 2, which has a tongue portion that engages a pair of shelves located on an opposite side of the illustrated turbine blades 76.

As mentioned above, the damper "tongue" 90 can pull out of location between shelves 88 under severe or unintended operation, caused primarily by the centrifugal load (arrow 82) acting radially (arrow 94) on the damper 72.

Creep and/or plasticity of the damper body and/or rigid body motion of the outer diameter of the damper 72 can cause the tongue 90 to slide outward more than the design intent.

Figure 4:
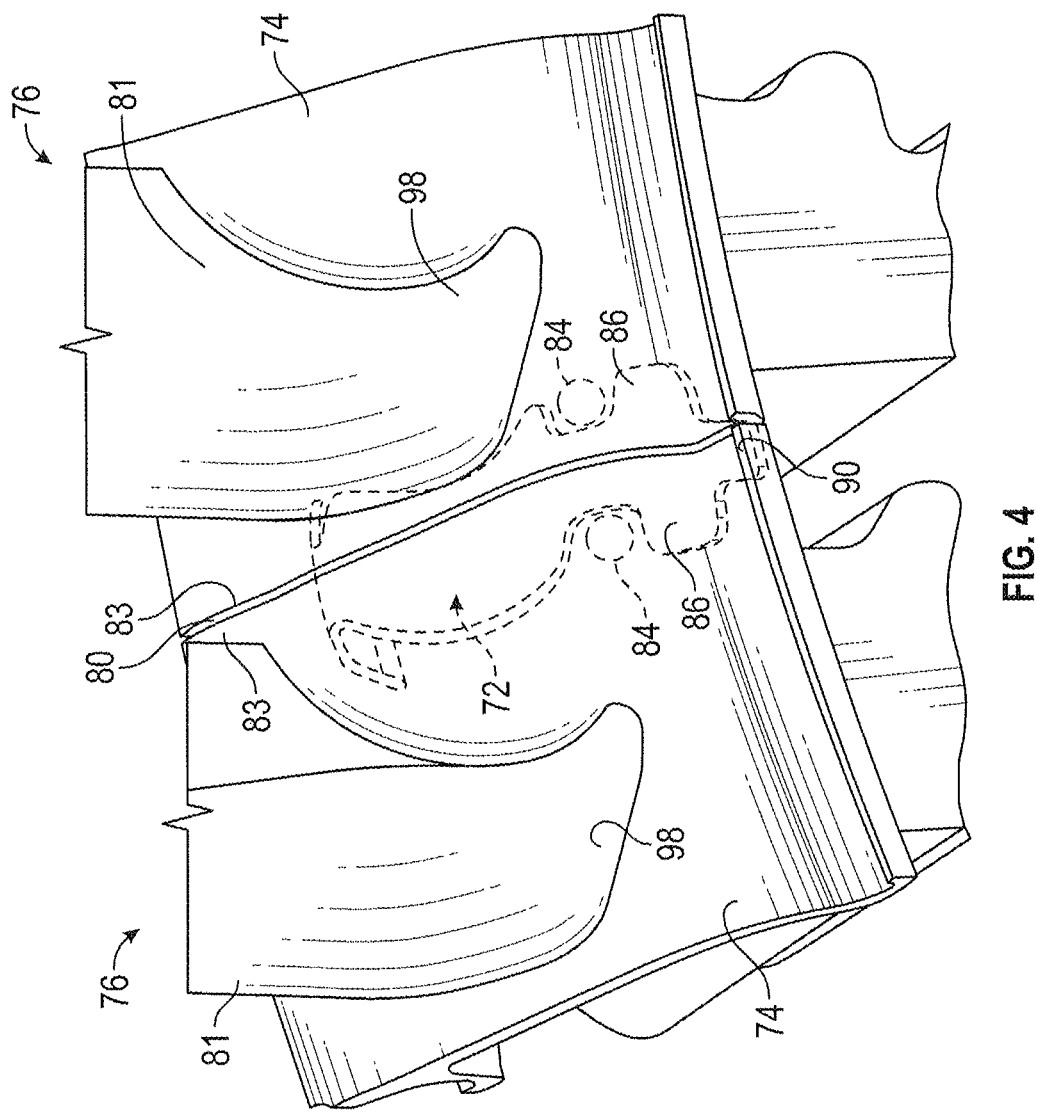
FIG. 4 is a top perspective view of a damper seal installed between two adjacent turbine blades.
Figure 5:
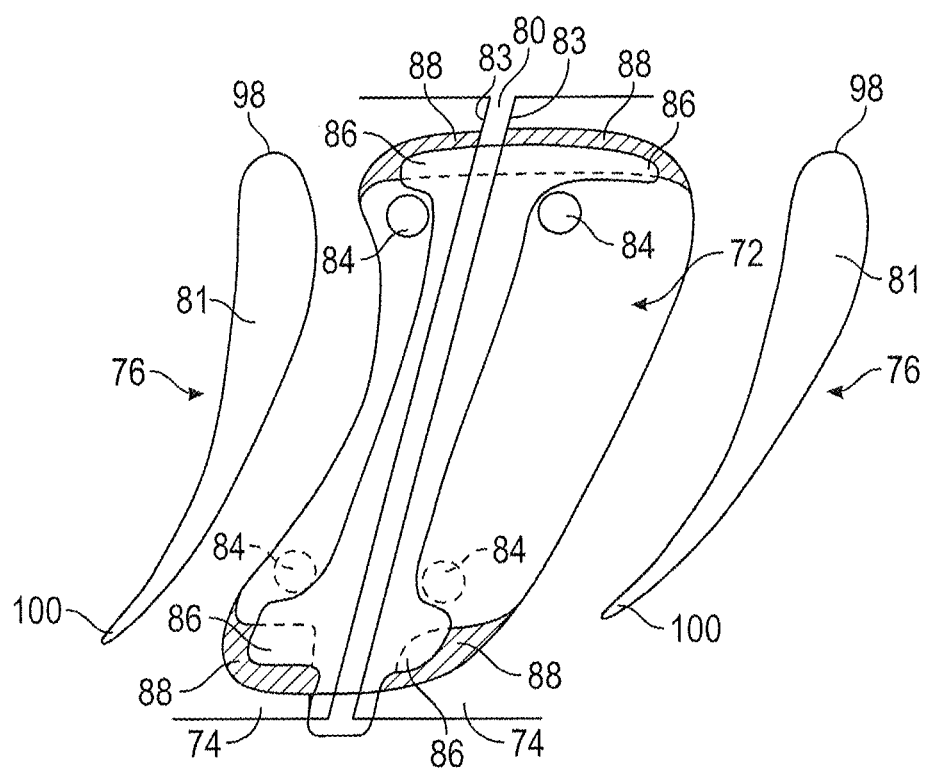
FIG. 5 is a top cross-sectional view of a damper seal installed between two adjacent turbine blades.

In one embodiment and as illustrated in at least FIGS. 3-5, the damper restraint 84 may be a "tab", "pin", "nub" or other protrusion to prevent the "tongue" from pulling out of its location between the shelves. As such, a pair of side by side raised features, rails or "bumps" provide the damper restraint 84 when they are side by side, which corresponds to the blades 76 being secured to the disc 70.

By locating the damper restraint 84 on an interior surface of adjacent platforms 74, a restraint system is provided that restrains the damper 72 from sliding both radially (arrow 92) and tangentially (arrows 94) as well as rotationally (arrows 96) when it is subject to tangential dynamic forces or rotational forces (e.g. induced by the orientation of the pocket (or broach angle) relative to the axis of rotation). Thus, undesired tangential and radial movement of the damper 72 is prevented.

The rails, bumps or features 84 provide a contact surface between the underside of the platforms and the seal damper or damper seal 72 such that a system is provided for suppressing both radial and tangential vibration.

FIGS. 4 and 5 are top views illustrating the damper, seal damper or damper seal 72 located between two adjacent blades. In FIG. 4, the protrusions are located on opposite peripheral edges of the damper 72 as well as above the tab portions 86. Accordingly, the protrusions may contact the peripheral edges as well as the top portions of the tab portions in order to prevent the damper from moving into an undesired located by moving in anyone of the directions illustrated by arrows, 92, 94 and 96. In FIG. 4 the protrusions are located proximate to the leading edge of the platform that is associated with a leading edge 98 of the airfoils 81. Alternatively, the protrusions 84 may also be located proximate to the trailing edge of the platform that is associated with a trailing edge 100 of the airfoils 81. As described above, the protrusions 84 are located to engage the peripheral edges as well as the top portions of the tab portions 86 that are located at the trailing edge in order to prevent the damper from moving into an undesired located by moving in anyone of the directions illustrated by arrows, 92, 94 and 96. As such, the protrusions 84 may be located at both the trailing and leading edges of the platforms.

In yet another embodiment, the protrusions may only be located proximate to the leading edge of the platform or they may be only located proximate to the trailing edge of the platform. In the event the protrusions are only located proximate to the leading edge of the platform, the trailing edge of the damper may be configured to not have tab portions 86. Still further and if the protrusions are only located proximate to the trailing edge of the platform, the leading edge of the damper may be configured to not have tab portions 86.

The configuration of the platforms 74 and the protrusions illustrated in the attached FIGS. are merely examples and various embodiments of the present disclosure are not intended to be limited to the specific configurations illustrated in the attached FIGS. Similarly, the configuration of the damper 72, tabs 86 and/or 90 illustrated in the attached FIGS. are merely examples and various embodiments of the present disclosure are not intended to be limited to the specific configurations illustrated in the attached FIGS.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A section of a gas turbine engine, comprising:
   a disk;
   a plurality of blades secured to the disk, each of the plurality of blades having a platform located between a root portion and an airfoil portion of the blade, wherein the platform of one of the plurality of blades is configured to define a cavity with another platform of an adjacent blade that is secured to the disk;
   a damper seal located in the cavity and positioned adjacent to a gap defined by edges of the platforms of the blades; and
   a damper restraint located on an interior surface of each platform, wherein the damper restraint of each platform extends into the cavity and is a raised feature configured to contact a peripheral edge portion of one of a pair of tab portions extending from opposite sides of the damper seal and a peripheral edge of the damper seal adjacent to the pair of tab portions when the damper seal is adjacent to the gap defined by the platforms of the blades, and wherein the damper restraint limits radial, tangential and rotational movement of the damper seal when the damper seal is adjacent to the gap defined by the platforms of the blades.

2. The section as in claim 1, wherein the damper restraint is a circular protrusion that extends from the interior surface.

3. The section as in claim 1, wherein the blade is a turbine blade.

4. The section as in claim 3, wherein the damper restraint is a circular protrusion that extends from the interior surface.

5. The section as in claim 1, wherein the blade is a compressor blade.

6. The section as in claim 1, wherein the damper seal is formed from stamped sheet metal.

7. The section as in claim 1, wherein the pair of tab portions engage the damper restraint when the damper seal is adjacent to the gap defined by the platforms of the blades.

8. The section as in claim 7, wherein the blades further comprise a damper shelf that is located in the cavity and the pair of tab portions are configured to engage the damper shelf.

9. The section as in claim 8, wherein the damper seal further comprises a tongue portion configured to be located adjacent to the damper shelf.

10. A gas turbine engine, comprising:
    a compressor section;
    a turbine section;
    a disk, wherein the disk is a portion of the compressor section or a portion of the turbine section;
    a plurality of blades secured to the disk, each of the plurality of blades having a platform located between a root portion and an airfoil portion of the blade, wherein the platform of one of the plurality of blades is configured to define a cavity with another platform of an adjacent blade that is secured to the disk;
    a damper seal located in the cavity and positioned adjacent to a gap defined by edges of the platforms of the blades; and
    a damper restraint located on an interior surface of each platform, wherein the damper restraint of each platform extends into the cavity and is a raised feature configured to contact a peripheral edge portion of one of a pair of tab portions extending from opposite sides of the damper seal and a peripheral edge of the damper seal adjacent to the pair of tab portions when the damper seal is adjacent to the gap defined by the platforms of the blades, and wherein the damper restraint limits radial, tangential and rotational movement of the damper seal when the damper seal is adjacent to the gap defined by the platforms of the blades.

11. The gas turbine engine as in claim 10, wherein the damper restraint is a circular protrusion that extends from the interior surface.

12. The gas turbine engine as in claim 10, wherein the blade is a turbine blade or a compressor blade.

13. The gas turbine engine as in claim 10, wherein the damper seal is formed from stamped sheet metal.

14. The gas turbine engine as in claim 10, wherein the pair of tab portions engage the damper restraint when the damper seal is adjacent to the gap defined by the platforms of the blades.

15. The gas turbine engine as in claim 14, wherein the blades further comprise a damper shelf that is located in the cavity and the pair of tab portions are configured to engage the damper shelf.

16. The gas turbine engine as in claim 15, wherein the damper seal further comprises a tongue portion configured to be located adjacent to the damper shelf.

\* \* \* \* \*